United States Patent [19]

Hopkin et al.

[11] 3,837,353

[45] Sept. 24, 1974

[54] APPARATUS AND METHOD FOR CONTROLLING THE LEVEL OF OIL IN A SURGE DRUM

[76] Inventors: Walker L. Hopkin, 119 Matisse, Houston, Tex. 77024; Leland A. Chvatal, 3949 Lansing Ave., Port Arthur, Tex. 77640; William D. White, 812 S. 10th St., Nederland, Tex. 77627

[22] Filed: Jan. 16, 1973

[21] Appl. No.: 324,007

Related U.S. Application Data

[62] Division of Ser. No. 214,322, Dec. 30, 1971.

[52] U.S. Cl. .................................... 137/8, 137/391
[51] Int. Cl. ............................................. G05d 9/12
[58] Field of Search ...................... 137/2, 8, 9, 391; 260/683.58; 208/212

[56] References Cited
UNITED STATES PATENTS

| | | | |
|---|---|---|---|
| 3,031,105 | 4/1962 | Walker | 137/391 X |
| 3,443,692 | 5/1969 | Halsey | 137/391 X |

*Primary Examiner*—Robert G. Nilson
*Attorney, Agent, or Firm*—T. H. Whaley; C. G. Ries

[57] ABSTRACT

Apparatus controls the level of oil in a surge tank in a processing unit of a refining system, receiving a charge liquid and which in turn provides a charge liquid to a second processing unit of the refining system. A signal is provided corresponding to a desired change $\Delta F_R$ to be made in the flow rate of the second processing unit charge liquid. A first change network receiving the change signal determines the magnitude of the desired change to the second processing unit charge liquid flow rate and provides a flow rate signal for controlling the first processing unit charge liquid flow rate in accordance with the desired change signal. The change $\Delta F_H$ in the first processing unit charge liquid flow rate may be equal to or some portion of the change $\Delta F_R$ to be made in the second processing unit liquid flow rate depending on the magnitude of the change signal. The change $\Delta F_H$ differs in different proportions depending on the magnitude of the change $\Delta F_R$. The network includes an absolute value circuit which provides a signal corresponding to the magnitude of the change signal. The change in the second processing unit charge liquid flow rate is delayed for a predetermined time interval and then implemented. The duration of the time interval is also determined as a function of the magnitude of the change $\Delta F_R$.

8 Claims, 3 Drawing Figures

APPARATUS AND METHOD FOR CONTROLLING THE LEVEL OF OIL IN A SURGE DRUM

This is a division of application Ser. No. 214,322, filed Dec. 30, 1971.

BACKGROUND OF THE INVENTION

The present invention relates to control systems in general and, more particularly, to a control system for controlling a level of a liquid in a surge drum.

DESCRIPTION OF THE PRIOR ART

Heretofore liquid level control for a surge drum in a processing unit was accomplished by sensing the liquid level in the surge drum and manually controlling the liquid being provided by the processing unit to a second processing unit. However, when a large change is made in the liquid flow rate going to the second processing unit, the change either completely evacuates the surge drum resulting in a starving of the second processing unit or causes an undesirable high liquid level in the surge drum thereby reducing its surge capacity.

The system of the present invention determines the change that shall be made in the flow rate of a liquid entering the first processing unit in view of an anticipated change to be made in the flow rate of the liquid going from the first processing unit to the second processing unit and initiates the change to the first processing unit charge liquid flow rate. The system also determines the time lag for the effect of the change in the first processing unit charge liquid flow rate to reach the surge drum and changes the second processing unit charge liquid flow rate at approximately that time to minimize the effect of the change in the second processing unit charge liquid flow rate on the surge drum liquid level.

SUMMARY OF THE INVENTION

Apparatus controls the level of a first liquid in a surge drum of a system processing a second liquid. The system receives the second liquid and discharges the first liquid after processing. The apparatus includes a source providing a signal corresponding to a change to be made to the flow rate of one of the liquids. Equipment receiving the change signal changes the flow rate of the other liquid in accordance with the change signal. Other equipment receiving the change signal changes the flow rate of the one liquid at some predetermined time relative to the change in the other liquid flow rate in accordance with the change signal.

The objects and advantages of the invention will appear hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
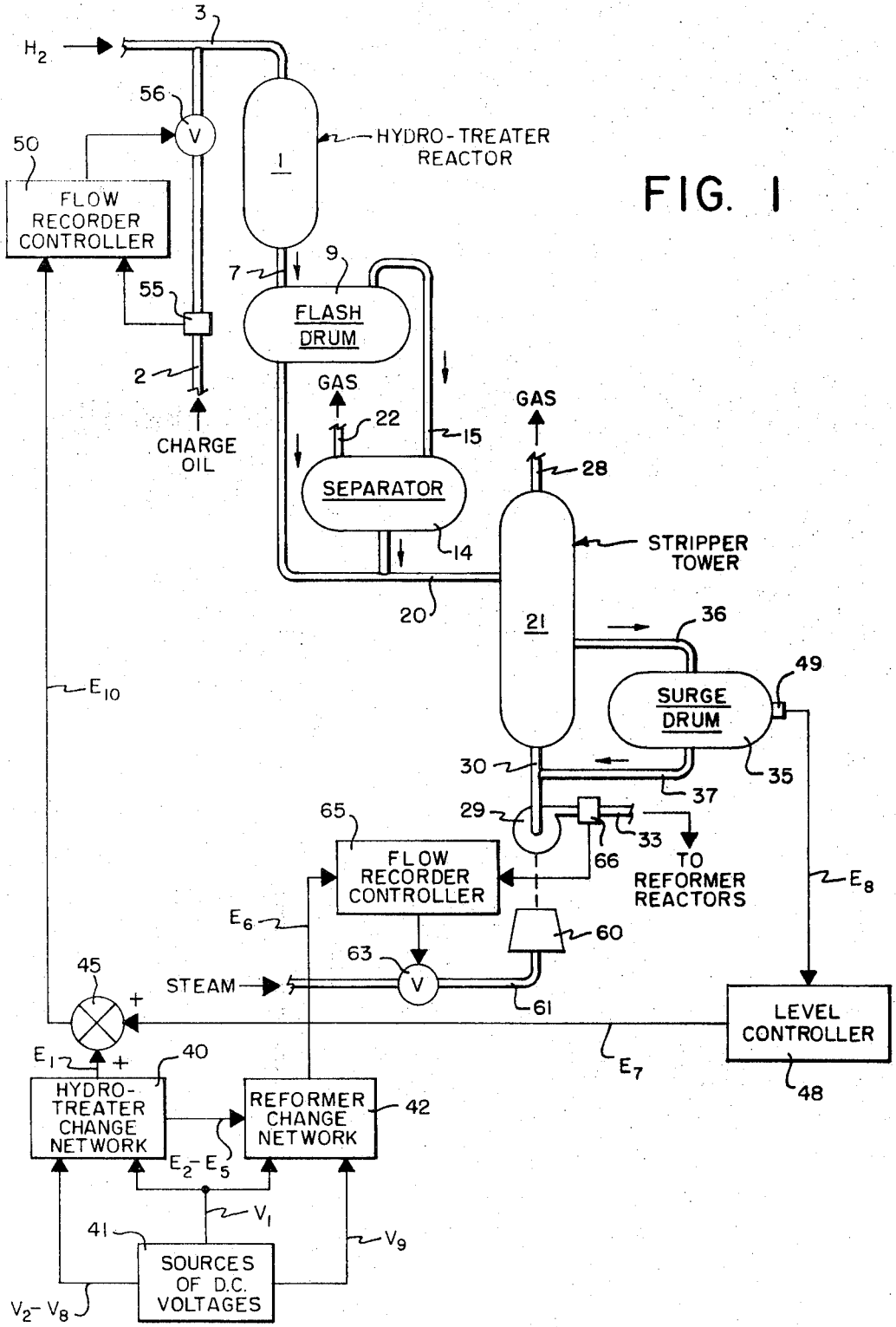
FIG. 1 shows a control system, constructed in accordance with the present invention for controlling the oil level in a surge drum in a hydrotreater unit, which is also partially shown in schematic form, providing oil to a catalytic reforming unit.

Referring to FIG. 1, there is shown a portion of a hydrotreater unit in which charge oil is processed to provide an output for further processing in a catalytic reforming unit. It is not necessary to the understanding of the present invention to know the details of the hydrotreating process involved and hence the process will only be briefly described. Hydrogen in line 3 mixes which charge oil entering a hydrotreater reactor 1 through lines 2,3. Effluent from reactor 1 leaves by way of line 7 and enters a flash drum 9. Flash drum 9 provides gas to a separator 14 by way of a line 15. Separator 14 further processes the gas in line 15 to provide a gas output through a line 22 and a liquid to line 20 for further processing in stripper tower 21.

Stripper tower 21 provides a gas output through line 28, while the oil from stripper tower 21 is withdrawn by a pump 29 through a line 30. Pump 29 provides the oil as charge oil to a catalytic reformer reactor (not shown) through a line 33. Minor transient changes in the flow rate of the charge oil in line 33 are prevented from affecting the hydrotreater charge rate by use of a surge drum 35 receiving charge oil for the catalytic reforming unit from stripper tower 21 through a line 36 and providing it to line 30 through a line 37.

The flow rate of the charge oil in line 33 is held at a specific value because it is a primary process variable and is often referred to as space velocity. Since the catalytic reformer charge rate is held relatively constant, it is varied to adjust for variation in the reactor charge surge drum level.

The adjustments for variation in surge drum 35 oil level is made by controlling the flow rate of the charge oil in line 2 to the hydrotreater unit. When a substantial change is made to the flow rate of the charge oil in line 33, it is desirable that the flow rate of the charge oil in line 2 be changed accordingly and at some time prior to the change in flow rate of the charge oil in line 33, so that surge drum 35 is not completely evacuated by the change or completely filled up by the change.

Due to physical properties of the hydrotreater unit, the change $\Delta F_H$ in flow rate of the charge oil in line 2 is some proportion of the change $\Delta F_R$ in flow rate of the charge oil in line 33 as indicated in the following equation:

$$\Delta F_H = (K)(\Delta F_R)$$

The correlation factor K differs as a function of the magnitude of $\Delta F_R$. The time lapse for the change $\Delta F_H$ to affect the oil level in surge drum 35 also differs as a function of the magnitude of the change $\Delta F_R$.

By way of example, the following table illustrates the correlation factor values and the time delay values for a particular hydrotreater unit. In the table, BPH stands for barrels per hour.

| ABSOLUTE VALUE OF $\Delta F_R$ (IN BPH) | FACTOR K | TIME DELAY (MINUTES) |
| --- | --- | --- |
| $\Delta F_R < 20$ | 1.00 | 5 |
| $20 \leq F_R \leq 60$ | 0.85 | 7 |
| $\Delta F_R > 60$ | 0.75 | 9 |

A hydrotreater change network 40 provides signals $E_1$, corresponding to a target hydrotreater flow rate $E_2$ through $E_5$ in accordance with direct current voltages $V_1$ through $V_8$ from a source 41. Signals $E_2$ through $E_5$ are applied to a reformer change network 42 receiving direct current voltages $V_1$ and $V_9$ from source 41, which in turn provides a signal $E_6$ corresponding to the desired flow rate for the charge oil in line 33. The change in signal $E_6$ will occur at some predetermined time after a change in signal $E_1$ as hereinafter explained.

Signal $E_1$ from hydrotreater change network 40 is applied to summing means 45 receiving a signal $E_7$ from a level controller 48. A sensor 49 connected to surge drum 35 senses the level of the oil in surge drum 35 and provides a corresponding signal $E_8$ to controller 48. Controller 48 provides signal $E_7$ corresponding to the difference between the actual oil level in surge drum 35 and the desired level as represented by the position of the set point in controller 48. The adjustment of the set point in controller 48 may be done manually and is not part of this control system.

If the oil level in surge drum 35 decreases, signal $E_7$ will increase in a positive direction. Sighal $E_7$ is added to signal $E_1$ by summing means 45 to provide signal $E_{10}$ to a flow recorder controller 50. Signal $E_{10}$ adjusts the set point of flow recorder controller 50. Flow recorder controller 50 receives a signal from a conventional type flow sensor 55 corresponding to the flow rate of the charge oil in line 2. A valve 56 is controlled by an output from flow recorder controller 50 to control the flow rate in line 2 in accordance with the position of controller 50 set point. Thus, signal $E_{10}$ is increased by the positive signal $E_7$ to change controller 50 set point for increased flow. Controller 50 controls valve 56 to increase the flow rate of the charge oil in line 22 and hence to increase the charge rate of reactor 1. Eventually, the increased flow rate in line 2 causes an increase in the oil level in surge drum 35.

The opposite is true when the oil in surge drum 35 increases above its predetermined level. Level controller 48 provides a negative signal $E_7$ in response to signal $E_8$ which in effect decreases signal $E_{10}$. Flow recorder controller 50 set is changed by signal $E_{10}$ to decrease the flow rate in line 2 thereby eventually restoring the oil in surge drum 35 to its predetermined value.

The flow rate of the charge oil in line 33 is controlled by controlling the speed of pump 29. Pump 29 is mechanically driven by a turbine 60 receiving steam through a line 61. A valve 63 in line 61 controls steam in line 61 to control the speed of turbine 60 and hence the speed of pump 29. A flow recorder controller 65 has a set point positioned in accordance with signal $E_6$ and receives a signal corresponding to the flow rate of the charge oil in line 33 from a flow rate sensor 66 in line 33. Controller 65 provides a signal to operate valve 63 so that the flow rate of the oil in line 33 is in accordance with the set point position. Thus, the flow rate in line 33 may be adjusted by adjusting the set point of flow recorder controller 65 thereby adjusting the speed of pump 29.

Figure 2:
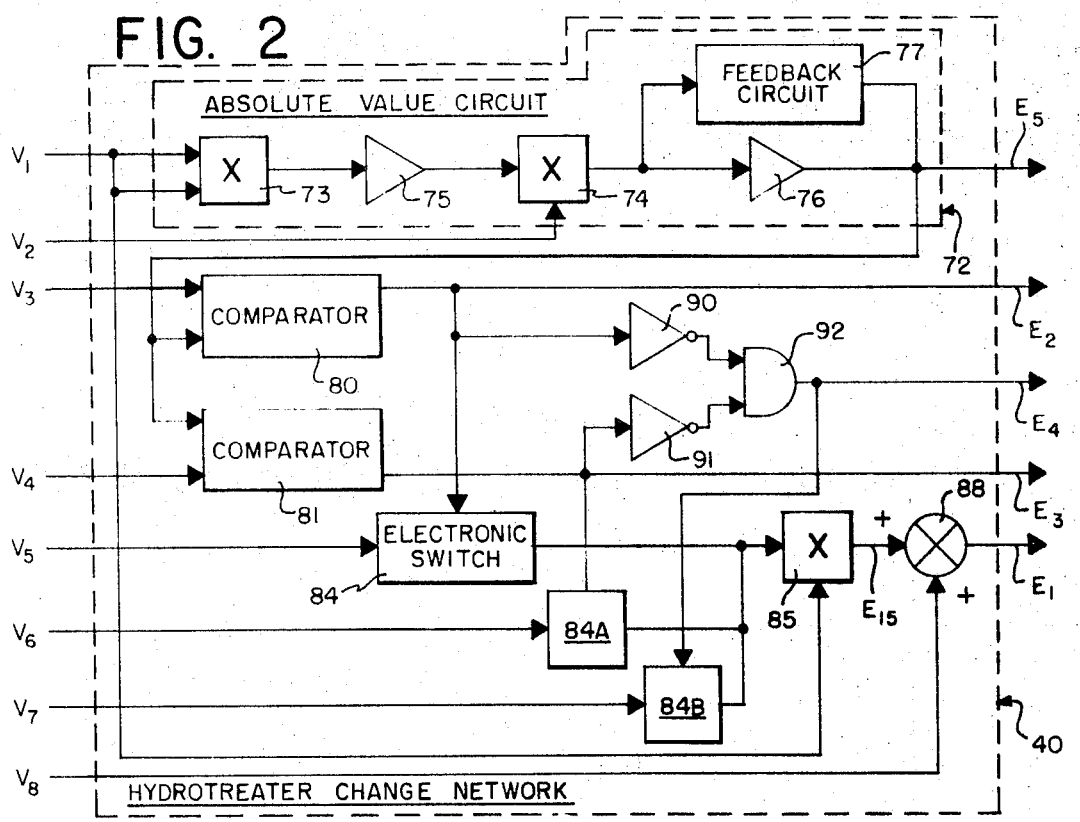
FIGS. 2 and 3 are detailed block diagrams of the hydrotreater change network and the reformer change network, respectively, shown in FIG. 1.

Referring to FIGS. 1 and 2, an operator initiates the change of the reformer charge rate by adjusting the amplitude of voltage $V_1$. Voltage $V_1$ corresponds to the change $\Delta R_R$ to be impressed on the flow rate of the oil in line 33 and as such may be positive for an increase in charge rate or negative for a decrease in the charge rate. An absolute value circuit 72 comprising multipliers 73 and 74, logarithmic amplifier 75, operational amplifier 76 and a feedback circuit 77 provide signal E corresponding to the absolute value of voltage $V_1$. The absolute value is obtained by squaring voltage $V_1$ and taking the square root of the squared voltage. Multiplier 73 effectively squares voltage $V_1$. Logarithmic amplifier 75 provides a signal corresponding to the logarithm of the output from multiplier 73 to multiplier 74. Multiplier 74 multiplies the output from logarithmic amplifier 75 with voltage $V_2$ corresponding to a value of 0.5. The product signal from multiplier 74 is applied to operational amplifier 76 having feedback circuit 77 connected across its input and output. Feedback circuit 77 is a function generator which may be of the type manufactured by Electronic Associates as their part number PC-12. Operational amplifier 76, in conjunction with feedback circuit 77, provides a signal corresponding to the antilog of the product signal from multiplier 74 as signal $E_5$.

Comparators 80, 81 control which correlation factor K will be used in changing the flow rate of the charge oil in line 2. Comparators 80, 81 compare signal $F_5$ with voltages $V_3$ and $V_4$ respectively. Voltage $V_4$ is more positive than voltage $V_3$. For the condition where $\Delta F_R$ is less than 20 BPH, signal $E_5$ is more negative than voltages $V_3$, $V_4$ causing comparators 80, 81 to provide signals $E_2$ and $E_3$ respectively at a high level and a low level respectively. Signals $E_2$, $E_3$ render electronic switches 84 and 84A, respectively, conductive and non-conductive respectively. Signals $E_2$, $E_3$ are inverted by inverters 90 and 91, respectively, and applied to an AND gate 92. The inverted signal $E_2$ from comparator 80 disables AND gate 92 causing AND gate 92 to provide signal $E_4$ at a low level. Signal $E_4$ renders an electronic switch 84B non-conductive. Switch 84 passes voltage $V_5$, corresponding to a correlation factor of 1.00, while switches 84A, 84B block voltages $V_6$ and $V_7$, respectively, corresponding to correlation factors of 0.75 and 0.85 respectively.

A multiplier 85 multiplies the change $\Delta F_R$ voltage $V_1$ by voltage $V_4$ passed by switch 84 to provide a signal $E_{15}$ corresponding to the change $\Delta F_H$ to be impressed on the hydrotreater charge rate. Summing means 88 sums signal $E_{15}$ from multiplier 85 with a direct current voltage $V_8$ corresponding to a target flow rate for the charge oil in line 2 to provide signal $E_1$ to flow recorder controller 50.

For the condition where $\Delta F_R$ is equal to or greater than 20 BPH and equal to or less than 60 BPH, signals $E_2$, $E_3$ from comparators 80 and 81, respectively, are at low levels since signal $E_5$ is equal to or more positive than voltage $V_3$ but less positive than voltage $V_4$. Low level signals $E_2$, $E_3$ render switches 84 and 84A respectively non-conductive to block voltages $V_5$ and $V_6$, respectively. Inverters 90, 91 invert outputs $E_2$ and $E_3$, respectively, to high levels which enables AND gate 92. When enabled, AND gate 92 provides signal $E_4$ at a high level to render switch 84B conductive to pass voltage $V_7$ to multiplier 85. The development of signal $E_1$ is the same as heretofore described except voltage $V_7$ is now used in lieu of voltage $V_5$.

For the condition where $\Delta F_R$ is greater than 60 BPH, voltage $V_6$ is used in developing signal $E_1$. Signal $E_5$ is more positive than voltages $V_3$, $V_4$ causing comparators 80, 81 to provide signals $E_2$ and $E_3$, respectively, at a low level and a high level, respectively. Since signal $E_3$ is at a high level, AND gate 92 provides signal $E_4$ at a low level in response to the inverted signal $E_3$ from inverter 91. Signal $E_3$ renders switch 84A conductive to pass voltage $V_6$ to multiplier 85 while signals $E_2$, $E_4$ render switches 84 and 84B, respectively, non-conductive to block voltages $V_5$ and $V_7$, respectively. Voltage $V_6$ is used in same manner in developing signal $E_1$ as heretofore described for voltage $V_5$.

Figure 3:
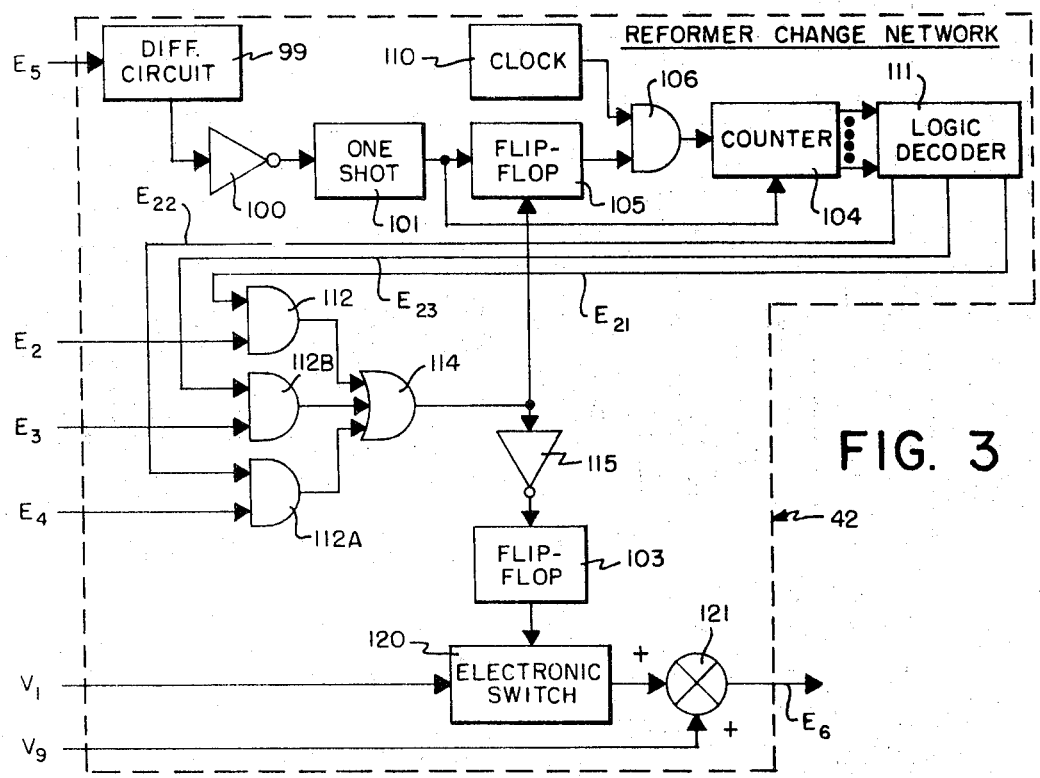

As noted previously in the table, there is associated a time delay with the change to the flow rate of the charge oil in line 33, to allow the change in line 2 charge oil to affect the level of oil in surge drum 35. Referring to FIGS. 1, 2 and 3, the absolute value signal $E_5$ is differentiated by a conventional type differentiating circuit 99. Differentiating circuit 99 provides a positive spike pulse which is inverted by an inverter 100 so that it may trigger a one shot multivibrator 101 causing multivibrator 101 to provide a positive pulse. The spike pulse differentiating circuit 99 resets a flip-flop 103 to a clear state. The positive pulse from multivibrator 101 resets a counter 104 while the trailing edge of the positive pulse triggers a flip-flop 105 to a set state. Flip-flop 103 or 105 provides a high level direct current output while in a set state, and a low level direct current output while in a clear state. The high level output from flip-flop 105 enables an AND gate 106 to pass timing pulses from a clock 110 to counter 104. The pulse repetition rate of the timing pulses from clock 110 should be selected to allow counter 104 to exceed the maximum time delay shown in the table without recycling. Counter 104 counts the timing pulses. A logic decoder 111 includes AND gates connected to counter 104 in a manner so as to provide three high level output signals $E_{21}$, $E_{22}$ and $E_{23}$ in response to different counts in counter 104 which occur at different times.

AND gates 112, 112A and 112B receive signals $E_{21}$, $E_{22}$ and $E_{23}$, respectively, from decoder 111 and signals $E_2$, $E_4$ and $E_3$ respectively, hydrotreater change network 40. AND gates 112 through 112B control the selection of the proper time delay associated with $\Delta F_R$. When $\Delta F_R$ is less than 20 BPH, $E_2$ is at a high level, as heretofore explained, and enables AND gate 112. Signal $E_{21}$ from logic decoder 111 is at a low level until the count in counter 104 corresponds to the time delay which, by way of example, may be five minutes. When the count in counter 104 corresponds to five minutes, signal $E_{21}$ goes to a high level and passes through the enabled AND gate 112 and an OR gate 114 to trigger flip-flop 105 to a clear state. AND gate 106 is disabled by the low level output from flip-flop 105 and blocks the timing pulses from clock 110 to prevent further counting by counter 104 so that output $E_{21}$ remains at a high level.

Signal $E_{21}$ passed by OR gate 114 is inverted by an inverter 115 to trigger flip-flop 103 to a set state. The high level output from flip-flop 103 renders an electronic switch 120 conductive to pass the $\Delta F_R$ change voltage $V_1$ to summing means 121. Summing means 121 sums the passed voltage $V_1$ with voltage $V_8$, which corresponds to the target reformer charge rate, to provide signal $E_6$ to flow recorder controller 65 after the time delay of five minutes. Before electronic switch 120 was rendered conductive summing means 121 provided voltage $V_8$ as signal $E_6$.

When signal $E_4$ is a high level signal, then signals $E_2$, $E_3$ are low level signals and only AND gate 112A is enabled. When counter 104 provides signal $E_{21}$, signal $E_{21}$ is blocked by the disabled AND gate 112 and counter 104 continues to count. When the count in counter 104 corresponds to seven minutes, signal $E_{22}$ goes to a high level and passes through AND gate 112A to have the same results as described heretofore for signal $E_{21}$ passing through AND gate 112 for a time delay of 5 minutes.

When signal $E_3$ is at a high level, signals $E_{21}$, $E_{22}$ have no effect on the time delay since AND gates 112, 112A are disabled by signals $E_2$ and $E_4$, respectively being at low levels. Counter 104 keeps on counting past the five and seven minute time intervals until its count corresponds to the time delay associated with the condition $\Delta F_R > 60$ BPH, which, for purpose of illustration, may be nine minutes; when the count in counter 104 corresponds to nine minutes signal $E_{22}$ goes to a high level and passes through AND gate 112B, which is enabled by signal $E_3$, and OR gate 114 with the same effect as heretofore described when signal $E_{21}$ passed through OR gate 114. However, now signal $E_6$ does not include voltage $V_1$ until after a time delay of 9 minutes instead of 5 minutes.

Flip-flop 103 permits a second change to be made to the catalytic reforming unit charge flow rate after the appropriate time delay. If the output from OR gate 114 controlled switch 120 directly, any change $\Delta F_R$ made after a first change $\Delta F_R$ would instantaneously change signal $E_6$ and affect the catalytic reforming unit charge oil flow rate. However, with flip-flop 103, a second change $\Delta F_R$ resets flip-flop 120 to a clear state to render switch 120 non-conductive. Switch 120 is not rendered conductive again until the appropriate time delay so that the new level voltage $V_1$ does not instantaneously affect signal $E_6$. The amount of time that signal $E_6$ will then correspond to voltage $V_9$ is negligible with regard to the refining unit response time.

It is obvious from the aforementioned equation that a change $\Delta F_H$ in the charge oil flow rate in line 2 may be predetermined instead of a $\Delta F_R$ and that the change $\Delta F_R$ of the charge oil flow rate in line 33 would be dependent on the change $\Delta F_H$ or $$\Delta F_R = \Delta F_H/(K)$$

The correlation factor K has the same values as heretofore mentioned. The change $\Delta F_H$ would be initiated first and, after the proper time delay, the change $\Delta F_R$ would be initiated.

The apparatus of the present invention as heretofore described controls the level of a liquid in a surge drum to avoid substantial changes in the liquid's level due to process changes in a system incorporating the surge drum. The apparatus as heretofore described changes the flow rate of charge oil entering a hydrotreater unit, having a surge drum and providing charge oil to a catalytic reforming unit, at some time prior to a change being made in the catalytic reforming unit charge oil flow rate so that by the time the catalytic reformer charge oil flow rate change reaches the surge drum the effect of the hydrotreater charge oil flow rate change also reaches the surge drum. The effect of the catalytic reforming unit charge oil flow rate change on the surge drum oil level is thereby minimized. The apparatus also determines the magnitude of the catalytic reforming unit charge oil change and uses the determined magnitude to control the hydrotreater charge oil flow rate change.

What is claimed is:

1. Apparatus for controlling the level of a processed liquid in a surge tank of a system processing a charge liquid in which the system receives the charge liquid and discharges the processed liquid, comprising means for providing a signal corresponding to a predetermined change $\Delta F_R$ to be made to the processed liquid's flow rate, means connected to the $\Delta F_R$ signal means for providing a signal corresponding to a change $\Delta F_H$ to be made to the charge liquid's flow rate in accordance with the $\Delta R_R$ signal and the following equation:

$$\Delta F_H = (K)(\Delta F_R)$$

where $K$ is a correlation factor, means connected to the $\Delta F_H$ signal means for changing the flow rate of the charge liquid in accordance with the $\Delta F_H$ signal, and means connected to the $\Delta F_R$ signal means for changing the flow rate of the processed liquid after a time delay determined by the magnitude of the change $\Delta F_R$ and in accordance with the $\Delta F_R$ signal.

2. Apparatus as described in claim 1 in which $K$ has different values associated with different magnitudes of $\Delta F_R$; the $\Delta F_H$ signal means includes means connected to the $\Delta F_R$ signal means for providing a signal corresponding to the absolute value of $\Delta F_R$ in accordance with the $\Delta F_R$ signal, means connected to the absolute value signal means and receiving direct current voltages corresponding to different values of $K$ for selecting a received direct current voltage in accordance with the absolute value signal, and means connected to the $\Delta F_R$ signal means and to the selecting means for providing the $\Delta F_H$ signal in accordance with the $\Delta F_R$ signal and the selected direct current voltage; and the charge liquid flow rate changing means includes means for sensing the level of the processed liquid in the surge tank and providing a signal corresponding to the difference between the sensed liquid level and a predetermined liquid level, and means connected to the $\Delta F_H$ signal means and to the liquid level sensing means and receiving a direct current voltage corresponding to a predetermined flow rate for the charge lqiudid for changing the charge liquid flow rate in accordance with the $\Delta F_H$ signal, the difference signal from the liquid level sensing means and the predetermined charge liquid flow rate direct current voltage.

3. Apparatus for controlling the level of a processed liquid in a surge tank of a system processing a charge liquid, comprising means for providing a signal corresponding to a predetermined change $\Delta F_H$ to be made to the charge liquid's flow rate, means connected to the $\Delta F_H$ signal means for providing a signal corresponding to a change $\Delta F_R$ to be made to the processed liquid's flow rate in accordance with the $\Delta F_H$ signal and the following equation:

$$\Delta F_R = (\Delta F_H)/(K)$$

where $K$ is a correlation factor, means connected to the $\Delta F_H$ signal means for changing the flow rate of the charge liquid in accordance with the $\Delta F_H$ signal, and means connected to the $\Delta F_R$ signal means and $\Delta F_H$ signal means for changing the flow rate of the processed liquid after a time delay determined by the magnitude of the change $\Delta F_H$ and in accordance with the $\Delta F_R$ signal.

4. Apparatus as described in claim 3 in which $K$ has different values associated with different magnitudes of $\Delta F_H$; the $\Delta F_R$ signal means includes means connected to the $\Delta F_H$ signal means for providing a signal corresponding to the absolute value of $\Delta F_H$ in accordance with the $\Delta F_H$ signal, means connected to the absolute value signal means and receiving direct current voltages corresponding to different values of $K$ for selecting a received direct current voltage in accordance with the absolute value signal, and means connected to the $\Delta F_H$ signal means and to the selecting means for providing the $\Delta F_R$ signal in accordance with the $\Delta F_H$ signal and the selected direct current voltage; and the charge liquid flow rate changing means includes means for sensing the level of the processed liquid in the surge tank and providing a signal corresponding to the difference between the sensed liquid level and a predetermined liquid level, and means connected to the $\Delta F_H$ signal means and to the liquid level sensing means and receiving a direct current voltage corresponding to a predetermined flow rate for the charge liquid for changing the charge liquid flow rate in accordance with the $\Delta F_H$ signal, the difference signal from the liquid level sensing means and the predetermined charge liquid flow rate direct current voltage.

5. A method for controlling the level of a processed liquid in surge tank of a system processing a charge liquid in which the system receives the charge liquid and discharges the processed liquid, which comprises the steps of: providing a signal corresponding to a predetermined change $\Delta F_R$ to be made to the processed liquid flow rate, providing a signal corresponding to a change $\Delta F_H$ to be made to the charge liquid flow rate in accordance with the $\Delta F_R$ signal and the following equation:

$$\Delta F_H = (K)(\Delta F_R)$$

where $K$ is a correlation factor, changing the flow rate of the charge liquid in accordance with the $\Delta F_H$ signal, and changing the flow rate of the processed liquid after a time delay determined by the magnitude of the change $\Delta F_R$ and in accordance with the $\Delta F_R$ signal.

6. A method as described in claim 5 in which $K$ has different values associated with different magnitudes of $\Delta F_R$; the $\Delta F_H$ signal step includes providing a signal corresponding to the absolute value of $\Delta F_R$ in accordance with the $\Delta F_R$ signal, providing direct current voltages corresponding to different values of $K$, selecting one of the provided direct current voltages in accordance with the absolute value signal, and providing the $\Delta F_H$ signal in accordance with the $\Delta F_R$ signal and the selected direct current voltage; and the changing the charge liquid flow rate step includes sensing the level of the processed liquid in the surge tank, providing a signal corresponding to the difference between the sensed processed liquid level and a predetermined liquid level, providing a direct current voltage corresponding to a predetermined flow rate for the charge liquid, and changing the charge liquid flow rate in accordance with the $\Delta F_H$ signal, the difference signal and the last mentioned direct current voltage.

7. A method for controlling the level of a processed liquid in a surge tank of a system processing a charge liquid in which the system receives the charge liquid and discharges the processed liquid, which comprises the steps of: providing a signal corresponding to a predetermined change $\Delta F_H$ to be made to the charge liquid flow rate, providing a signal corresponding to a change $\Delta F_R$ to be made to the processed liquid flow rate in accordance with the $\Delta F_H$ signal and the following equation:

$$\Delta F_R = \Delta F_H/(K)$$

where $K$ is a correlation factor, changing the flow rate of the charge liquid in accordance with the $\Delta F_H$ signal, and changing the flow rate of the processed liquid after a time delay determined by the magnitude of the change $\Delta F_H$ and in accordance with the $\Delta F_R$ signal.

8. A method as described in claim 7 in which $K$ has different values associated with different magnitudes of $\Delta F_H$; the $\Delta F_R$ signal step includes providing a signal corresponding to the absolute value of $\Delta F_H$ in accordance with the $\Delta F_H$ signal, providing direct current voltages corresponding to different values of $K$, selecting one of the provided direct current voltages in accordance with the absolute value signal, and providing the $\Delta F_R$ signal in accordance with the $\Delta F_H$ signal and the selected direct current voltage; and the changing the charge liquid flow rate step includes sensing the level of the processed liquid in the surge tank, providing a signal corresponding to the difference between the sensed processed liquid level and a predetermined liquid level, providing a direct current voltage corresponding to a predetermined flow rate for the charge liquid, and changing the charge liquid flow rate in accordance with the $\Delta F_H$ signal, the difference signal and the last mentioned direct current voltage.

* * * * *

UNITED STATES PATENT OFFICE
CERTIFICATE OF CORRECTION

PATENT NO. : 3,837,353
DATED : September 24, 1974
INVENTOR(S) : W.L. Hopkins, L.A. Chvatal, W.D. White It is certified that error appears in the above-identified patent and that said Letters Patent are hereby corrected as shown below:

Column 3, line 67, " $R_R$ " should read -- $F_R$ --

Column 2, line 13, "which" should read --with--

Column 7, line 11, " $R_R$ " should read -- $F_R$ --

Column 7, line 42, "lqiudid" should read --liquid--

Inventors, "Walker L. Hopkin" should read --Walker L. Hopkins--

Signed and Sealed this fourteenth Day of October 1975

[SEAL]

Attest:

RUTH C. MASON
*Attesting Officer*

C. MARSHALL DANN
*Commissioner of Patents and Trademarks*